United States Patent [19]

Brazell

[11] Patent Number: 4,759,177
[45] Date of Patent: Jul. 26, 1988

[54] SAFETY LINK

[76] Inventor: Rex K. Brazell, 2155 Facendinin La., Sebastopol, Calif. 95472

[21] Appl. No.: 118,115

[22] Filed: Nov. 6, 1987

[51] Int. Cl.$^4$ .................................................. F16G 13/06
[52] U.S. Cl. ............................................. 59/86; 59/93; 24/339; 403/321; 403/155; 411/317; 411/121
[58] Field of Search .................. 59/85, 86, 93, 95; 403/231, 321, 155, 167; 24/339; 411/316, 317, 121

[56] References Cited

U.S. PATENT DOCUMENTS

| | | | |
|---|---|---|---|
| 1,126,847 | 2/1915 | Pardini | 411/316 |
| 1,550,784 | 8/1925 | Cooke | 59/86 |
| 3,462,945 | 8/1969 | Barber | 59/86 |
| 3,517,417 | 6/1970 | Kachel | 24/339 |
| 3,922,103 | 11/1975 | Hirato | 24/339 |
| 3,932,049 | 1/1976 | Hirato | 24/339 |
| 4,081,954 | 4/1978 | Arnold | 59/86 |
| 4,307,567 | 12/1981 | Archer | 59/86 |
| 4,476,673 | 10/1984 | Brown | 59/86 |

*Primary Examiner*—David Jones
*Attorney, Agent, or Firm*—Townsend and Townsend

[57] ABSTRACT

A shackle safety keeper for keeping the threaded eye bolt of closing a U-shaped shackle from rotation of the eye bolt and ultimate disengagement of the shackle. The shackle safety keeper is a single wire continuously bent to form the disclosed keeper. This wire is bent intermediate its two ends at a bowed spring portion. This bowed spring portion has two depending shackle engagement sections extending downwardly and at right angles from the bowed spring portion. These sections are for clamping to the side edges of the U-shaped shackle adjacent the protruding eye on the shackle bolt. The lower end of each shackle engagement section has protruding angularly outward therefrom two eye reaching legs. These eye reaching legs extend from the bottom of each shackle engaging section out into registry with the eye on the protruding bolt when it has closed the shackle. The two eye reaching legs end the all wire constructed keeper with two opposed and overlapping eye piercing lugs. These lugs are the members which extend through the opening defined by the eye of the bolt on the shackle and prevent bolt rotation relative to the shackle.

3 Claims, 1 Drawing Sheet

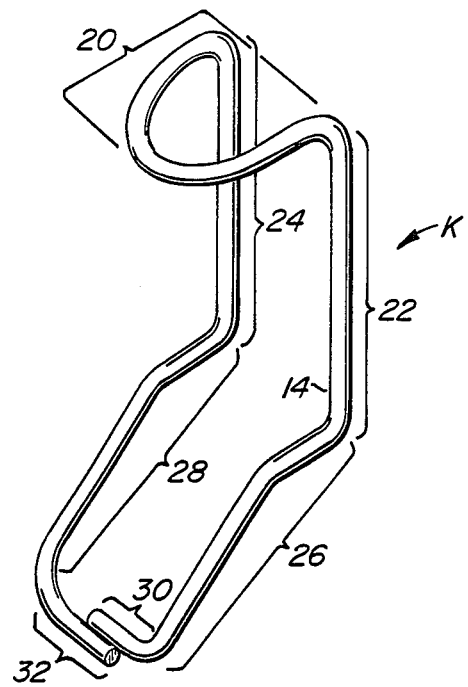
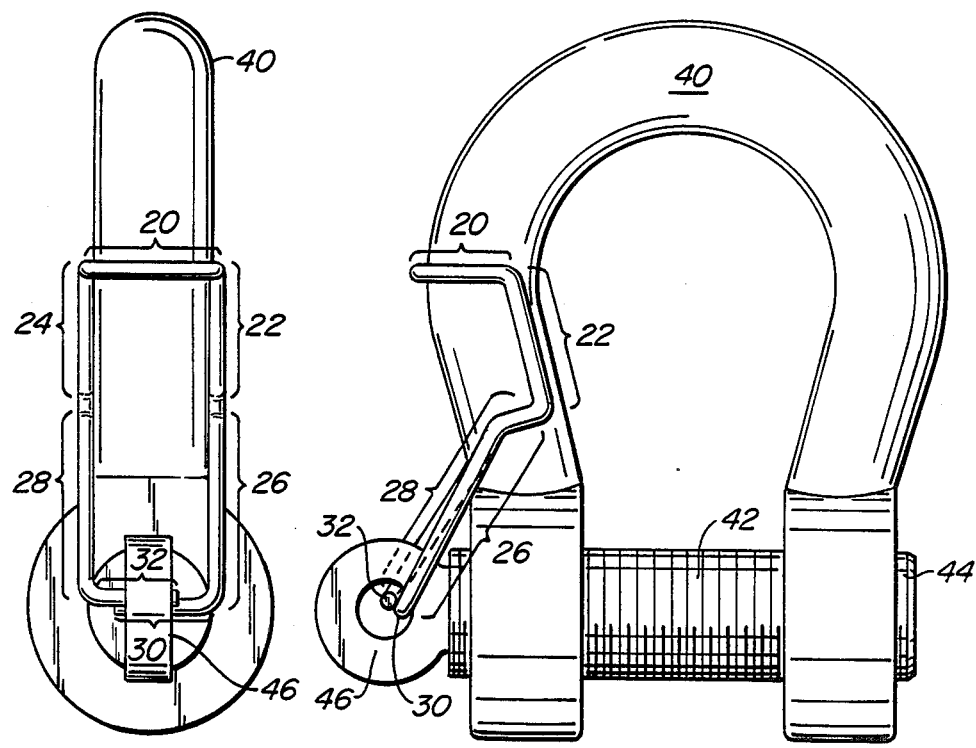

SAFETY LINK

This invention relates to shackles. More particularly, an all wire shackle keeper is disclosed.

SUMMARY OF THE PRIOR ART

Shackle keepers are known. Such keepers usually include flat metal members bent to cooperate with specially constructed shackles. See Cooke U.S. Pat. No. 1,550,784. Barber U.S. Pat. No, 3,462,945 and Archer U.S. Pat. No. 4,307,567.

A more convenient shackle pin locking construction is illustrated in Brown U.S. Pat. No. 4,476,673. In this embodiment clamping of a shackle at the leg adjacent the eye of a threaded bolt is shown. A depending member grasps the side edge of the eye to prevent its rotation. No fastening of the member to the bolt eye is disclosed. Thus, if the locking device is dislodged it falls free and clear from the shackle.

SUMMARY OF THE INVENTION

A shackle safety keeper is disclosed for keeping the threaded eye bolt of closing a U-shaped shackle from rotation of the eye bolt and ultimate disengagement of the shackle. The shackle safety keeper is a single wire continuously bent to form the disclosed keeper. This wire is bent intermediate its two ends at a bowed spring portion. This bowed spring portion has two depending shackle engagement sections extending downwardly and at right angles from the bowed spring portion. These sections are for clamping to the side edges of the U-shaped shackle adjacent the protruding eye on the shackle bolt. The lower end of each shackle engagement section has protruding angularly outward therefrom two eye reaching legs. These eye reaching legs extend from the bottom of each shackle engaging section out into registry with the eye on the protruding bolt when it has closed the shackle. The two eye reaching legs end the all wire constructed keeper with two opposed and overlapping eye piercing lugs. These lugs are the members which extend through the opening defined by the eye of the bolt on the shackle and prevent bolt rotation relative to the shackle. In operation, the shackle is closed by full insertion and twisting of the bolt, typically by grasping and rotating the eye. The all wire shackle keeper is spread at the opposed eye piercing lugs and the lugs threaded through the aperture defined by the eye at the end of the shackle bolt to fasten the keeper to the eye. The keeper is then rotated up into contact with that section of the U-shaped shackle adjacent the eye. The keeper is pushed onto and snapped onto the U-shaped shackle body at the two depending shackle engagement sections with the bowed spring section maintaining sufficient tension for firm engagement. The keeper thus is locked to the side of the U-shaped shackle body and at the same time transpierces the eye of the shackle closing bolt. Locking of the bolt from rotation results.

OTHER OBJECTS, FEATURES AND ADVANTAGES

An object of this invention is to illustrate how from a single piece of spring wire a safety keeper for a shackle can be constructed.

An advantage of the illustrated construction is that the wire size and stiffness can be changed for the requirements of the particular keeper utilized. Where, for example, a shackle is semipermanent the wire diameter can be large and its stiffness correspondingly large for semipermanent installation. Alternatively, and where the shackle is connected and disconnected, the wire can be of reduced stiffness so that the keeper can be conveniently removed.

A further object of this invention is to disclose the combination of a U-shaped shackle with its all wire keeper.

An advantage of this aspect of the invention is that the keeper is affixed to the shackle. It does not fall free of the shackle upon disengagement. Moreover, depending upon the stiffness of the keeper, the keeper can be used for rotation of the shackle bolt.

Yet another advantage of the disclosed construction is that the depending keeper is a telltale indication of nonengagement with its shackle. That is to say, the disengaged keeper depending in an unsightly fashion from the U-sectioned shackle is an indication of an unsafe, nonlocked disposition.

BRIEF DESCRIPTION OF THE DRAWINGS

Other objects, features, and advantages will become more apparent in this invention after referring to the figures in which:

FIG. 1 is a perspective of the keeper separate and apart from a shackle;

FIG. 2 is a side elevation of a keeper engaged with a shackle;

FIG. 3 is a front elevation of the keeper engaged with a shackle illustrating in particular the threading of the eye bolt by the lower end of the keeper.

Referring to FIG. 1, a keeper K is shown. As can be seen, it is constructed from a single piece of wire 14. Typically, the wire 14 is chosen for its stiffness dependent upon the application involved.

The shackle includes an upper bowed section 20. This bowed section serves as a spring in two respects. First, it allows installation of the shackle to the eye bolt. Second, it permits the shackle to grasp that side of a U-shaped shackle immediately adjacent the protruding eye of the bolt.

At each end of the bowed spring portion 20 are two depending shackle engaging portions 22, 24. The shackle engaging portions extend at right angles downwardly in parallel relation from the bowed spring portion 20. These two shackle engaging portions 22, 24 engage opposite sides of one leg of the U-shaped shackle. They are urged around and towards the U-shaped shackle by the spring portion 20. It is their function to firmly grip the sides of the U-shaped shackle.

At the bottom of shackle engagement portion 22 there extends a first shackle reach leg 26. Similarly, at the bottom of shackle engagement 24 there extends a second shackle reach leg 28.

Reach leg 26 terminates in an eye transpiercing lug 30. Reach leg 28 terminates in an eye transpiercing lug 32. Lugs 30 and 32 are opposed. Moreover, lugs 30 and 32 are parallel adjacent and overlap. It is these lugs 30 and 32 which, when spread apart, enable the keeper K to engage the eye of a shackle bolt.

Referring to FIG. 3 a conventional U-shaped shackle 40 is illustrated. It is transpierced by a shackle bolt 42. The bolt is threaded into threads (not shown) at end 44. It has a defined eye 46 at the opposite end.

Operation of the keeper can be easily understood. Shackle 40 is preferably closed by bolt 42 being threaded into the shackle bolt 40. When the bolt is closed, defined eye 46 is rotated to be generally in the same plane as shackle 40. With the defined eye 46 in this parallel portion, initially, shackle reach legs 26, 28 are pulled apart one from another. This opens lugs 30, 32 so that eye 46 of the bolt 42 can be pierced by the end of the shackle. The keeper is thus engaged to the eye of the bolt. Thereafter, the keeper is rotated upwardly to and towards that side of the U-sectioned bolt 40 which is adjacent eye 46. This rotation occurs until shackle engaging portions 22, 24 engage opposite sides of the U-shaped shackle bolt 40. Thereafter, the keeper is pressed in a spring urged fit over the sides of the shackle. This spring urged fit comes from the bowed portion 20. The shackle keeper engages the sides of the bolt as illustrated in FIG. 3.

It will be understood that the disclosed construction is above all else simple. By the bending of a single piece of wire, a shackle keeper is disclosed.

What is claimed is:

1. A shackle safety keeper for keeping a threaded eye bolt in place between the ends of a U-shaped shackle by preventing rotation of said eye bolt, said keeper comprising:
    a single bent piece of wire, said wire bent intermediate its ends to a bowed spring portion for firmly engaging the side of said shackle adjacent the eye;
    said spring portion supporting two dependent shackle engaging wire sections, said sections disposed in side-by-side alignment for engagement to the side of said shackle bolt as urged by said bowed spring portion;
    two eye reaching legs extending from the ends of said shackle engagement sections to registry with the eye of said shackle bolt; and,
    two opposed parallel and adjacent lugs extending from said eye reaching legs through the eye of said bolt whereby said bolt is prevented from rotation.

2. The shackle safety keeper of claim 1 and wherein said two high reaching legs include a bend in said legs between the bottom of said shackle engagement portion and said opposed parallel and adjacent lugs.

3. A shackle and safety keeper comprising in combination: a U-shaped shackle defining oars for permitting transpiercing of said U-shaped shackle;
    a shackle bolt closing said U-shaped shackles, said shackle bolt including a defined eye and thread means for threading said bolt to said shackle;
    a shackle safety keeper fabricated from a single bent piece of wire, said wire bent intermediate its ends to a bowed spring portion, said spring portion supplying spring force fo firmly engaging the side of said shackle adjacent said eye;
    said spring force supporting two dependent shackle engaging wire sections, said sections disposed in side-by-side alignment for engagement to the side of said shackle adjacent said eye as urged by said bowed spring portion;
    two eye reaching legs extending from the ends of said shackle engagement sections remote from said spring portion into registry with the eye of said shackle bolt; and, two opposed parallel and adjacent lugs extending from said eye reaching legs through the eye of said bolt whereby said bolt is prevented from rotation.

* * * * *